US012491794B1

United States Patent
Rich et al.

(10) Patent No.: US 12,491,794 B1
(45) Date of Patent: Dec. 9, 2025

(54) VEHICLE ENERGY STORAGE SYSTEMS INCLUDING MULTIPLE DC-DC POWER CONVERTERS

(71) Applicant: GM GLOBAL TECHNOLOGY OPERATIONS LLC, Detroit, MI (US)

(72) Inventors: Dave Gerard Rich, Sterling Heights, MI (US); James Morrison, Sebringville (CA); Mohamed Kamel, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/893,416

(22) Filed: Sep. 23, 2024

(51) Int. Cl.
| | |
|---|---|
| *B60L 58/22* | (2019.01) |
| *B60L 58/12* | (2019.01) |
| *H01M 10/42* | (2006.01) |
| *H01M 50/51* | (2021.01) |
| *H02J 1/08* | (2006.01) |
| *H02M 1/00* | (2006.01) |

(52) U.S. Cl.
CPC ............... *B60L 58/22* (2019.02); *B60L 58/12* (2019.02); *H01M 10/425* (2013.01); *H01M 50/51* (2021.01); *H02J 1/082* (2020.01); *H02M 1/0016* (2021.05); *B60L 2210/10* (2013.01); *H01M 2220/20* (2013.01)

(58) Field of Classification Search
CPC ...... B60L 58/22; B60L 58/12; B60L 2210/10; H01M 10/425; H01M 50/51; H01M 2220/20; H02J 1/082; H02M 1/0016
See application file for complete search history.

(56) References Cited

U.S. PATENT DOCUMENTS

2011/0094821 A1 * 4/2011 Aoki ..................... B62D 5/046
318/472

FOREIGN PATENT DOCUMENTS

| DE | 102016220893 A1 * | 4/2018 | .............. H02M 1/32 |
|---|---|---|---|
| DE | 102018213180 A1 | 2/2020 | |
| DE | 102023121008 A1 | 7/2024 | |
| WO | WO-2012085459 A1 | 6/2012 | |

OTHER PUBLICATIONS

U.S. Appl. No. 18/504,202, filed Nov. 8, 2023, Kamel, Mohamed.
U.S. Appl. No. 18/526,044, filed Dec. 1, 2023, Kamel, Mohamed.
(Continued)

*Primary Examiner* — Daniel Cavallari

(57) ABSTRACT

An energy storage system for an electric vehicle includes multiple battery modules, multiple DC-DC power converters, a DC bus configured to supply power to one or more loads, and a vehicle control module configured to obtain a temperature of each of the plurality of DC-DC power converters, assign a first output voltage setpoint to a first one of the plurality of DC-DC power converters having a lowest temperature, and in response to the temperature of the first one of the plurality of DC-DC power converters being greater than or equal to the temperature of another one of the plurality of DC-DC power converters, assign a second output voltage setpoint to a second one of the plurality of DC-DC power converters, and reduce the output voltage setpoint of the first one of the plurality of DC-DC power converters to a value less than the second output voltage setpoint.

20 Claims, 6 Drawing Sheets

(56) References Cited

OTHER PUBLICATIONS

U.S. Appl. No. 18/480,046, filed Oct. 3, 2023, Cawthorne, William R.
U.S. Appl. No. 18/403,069, filed Jan. 3, 2024, Kang, Jun-mo.
German Office Action from counterpart DE1020241319437, dated Jul. 25, 2025.

* cited by examiner

VEHICLE ENERGY STORAGE SYSTEMS INCLUDING MULTIPLE DC-DC POWER CONVERTERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle energy storage systems, and more particularly to vehicle energy storage systems including multiple DC-DC power converters.

Electric vehicles such as pure electric vehicles and/or plug-in hybrid electric vehicles include DC-DC power converters for powering a low voltage load.

SUMMARY

An example energy storage system for an electric vehicle includes a plurality of battery modules, a plurality of DC-DC power converters each having first and second sides, each of the first sides coupled to one of the battery modules, a DC bus coupled to the second sides of the plurality of DC-DC power converters, the DC bus configured to supply power to one or more loads, and a vehicle control module configured to obtain a temperature of each of the plurality of DC-DC power converters, assign a first output voltage setpoint to a first one of the plurality of DC-DC power converters having a lowest temperature, wherein output voltage setpoints assigned to other DC-DC power converters are less than the first output voltage setpoint, supply power to the DC bus via at least the first one of the plurality of DC-DC power converters, and in response to the temperature of the first one of the plurality of DC-DC power converters being greater than or equal to the temperature of another one of the plurality of DC-DC power converters, assign a second output voltage setpoint to a second one of the plurality of DC-DC power converters, and reduce the output voltage setpoint of the first one of the plurality of DC-DC power converters to a value less than the second output voltage setpoint.

In some examples, each of the plurality of battery modules includes a column of multiple battery cells connected in series. In some examples, each of the plurality of DC-DC power converters is coupled with only one of the plurality of battery modules.

In some examples, the second output voltage setpoint and the first output voltage setpoint are equal.

In some examples, the vehicle control module is configured to, in response to the temperature of the second one of the plurality of DC-DC power converters being greater than or equal to the temperature of another one of the plurality of DC-DC power converters assign a third output voltage setpoint to a third one of the plurality of DC-DC power converters, and reduce the output voltage setpoint of the second one of the plurality of DC-DC power converters to a value less than the third output voltage setpoint.

In some examples, the first one of the plurality of DC-DC power converters has a lowest temperature of the plurality of DC-DC power converters, the second one of the plurality of DC-DC power converters has a second lowest temperature of the plurality of DC-DC power converters, and the third one of the plurality of DC-DC power converters has a third lowest temperature of the plurality of DC-DC power converters.

In some examples, the vehicle control module is configured to obtain a state of charge value for each of the plurality of battery modules, assign a third output voltage setpoint to a third one of the plurality of DC-DC power converters coupled with a third one of the plurality of battery modules having a highest state of charge, wherein output voltage setpoints assigned to other DC-DC power converters are less than the third output voltage setpoint, supply power to the DC bus via at least the third one of the plurality of DC-DC power converters, and in response to the state of charge of the third one of the plurality of battery modules being less than or equal to the state of charge of another one of the plurality of battery modules, assign a fourth output voltage setpoint to a fourth one of the plurality of DC-DC power converters, and reduce the output voltage setpoint of the third one of the plurality of DC-DC power converters to a value less than the fourth output voltage setpoint.

In some examples, the third output voltage setpoint and the fourth output voltage setpoint are equal.

In some examples, the vehicle control module is configured to, in response to the state of charge of the fourth one of the plurality of battery modules being less than or equal to the state of charge of another one of the plurality of battery modules, assign a fifth output voltage setpoint to a fifth one of the plurality of DC-DC power converters, and reduce the output voltage setpoint of the fourth one of the plurality of DC-DC power converters to a value less than the fifth output voltage setpoint.

In some examples, the vehicle control module is configured to transition from assigning output voltage setpoints based on temperatures of the plurality of DC-DC power converters, to assigning output voltage setpoints based on state of charge values of the plurality of battery modules, in response to each of the DC-DC power converters having equal temperature.

In some examples, the vehicle control module is configured to assign output voltage setpoints based on temperatures of the plurality of DC-DC power converters in response to the electric vehicle being in a fail operational power (FOP) mode, the vehicle control module is configured to assign output voltage setpoints based on temperatures of the plurality of DC-DC power converters in response to the electric vehicle being in a normal operation mode and a value of average low voltage power supplied to the DC bus being greater than a specified threshold, and the vehicle control module is configured to assign output voltage setpoints based on state of charge values of the plurality of battery modules, in response to the electric vehicle being in a normal operation mode and a value of average low voltage power supplied to the DC bus being less than a specified threshold.

In some examples, the vehicle control module is configured to rotate between cycles of different output voltage settings for each of the plurality of DC-DC power converters, wherein in each cycle one of the plurality of DC-DC power converters is assigned a higher output voltage setpoint than other DC-DC converters, and each cycle lasts for a specified time period or a specified Coulomb count for the one of the plurality of DC-DC power converters having the higher output voltage setpoint.

In some examples, the vehicle control module is configured to transition from assigning output voltage setpoints based on temperatures of the plurality of DC-DC power converters, to assigning output voltage setpoints based on state of charge values of the plurality of battery modules, in response to each of the DC-DC power converters having equal temperature.

An example control method for an energy storage system for an electric vehicle, the energy storage system including a plurality of battery modules, a plurality of DC-DC power converters each having first and second sides, each of the first sides coupled to one of the battery modules, and a DC bus coupled to the second sides of the plurality of DC-DC power converters, the DC bus configured to supply power to one or more loads, wherein the method comprises obtaining a temperature of each of the plurality of DC-DC power converters, assigning a first output voltage setpoint to a first one of the plurality of DC-DC power converters having a highest temperature, wherein output voltage setpoints assigned to other DC-DC power converters are less than the first output voltage setpoint, supplying power to the DC bus via at least the first one of the plurality of DC-DC power converters, and in response to the temperature of the first one of the plurality of DC-DC power converters being greater than or equal to the temperature of another one of the plurality of DC-DC power converters, assigning a second output voltage setpoint to a second one of the plurality of DC-DC power converters, and reduce the output voltage setpoint of the first one of the plurality of DC-DC power converters to a value less than the second output voltage setpoint.

In some examples, each of the plurality of battery modules includes a column of multiple battery cells connected in series. In some examples, each of the plurality of DC-DC power converters is coupled with only one of the plurality of battery modules.

In some examples, the second output voltage setpoint and the first output voltage setpoint are equal.

In some examples, the method includes, in response to the temperature of the second one of the plurality of DC-DC power converters being greater than or equal to the temperature of another one of the plurality of DC-DC power converters assigning a third output voltage setpoint to a third one of the plurality of DC-DC power converters, and reducing the output voltage setpoint of the second one of the plurality of DC-DC power converters to a value less than the third output voltage setpoint.

In some examples, the first one of the plurality of DC-DC power converters has a lowest temperature of the plurality of DC-DC power converters, the second one of the plurality of DC-DC power converters has a second lowest temperature of the plurality of DC-DC power converters, and the third one of the plurality of DC-DC power converters has a third lowest temperature of the plurality of DC-DC power converters.

In some examples, the method includes obtaining a state of charge value for each of the plurality of battery modules, assigning a third output voltage setpoint to a third one of the plurality of DC-DC power converters coupled with a third one of the plurality of battery modules having a highest state of charge, wherein output voltage setpoints assigned to other DC-DC power converters are less than the third output voltage setpoint, supplying power to the DC bus via at least the third one of the plurality of DC-DC power converters, and in response to the state of charge of the third one of the plurality of battery modules being less than or equal to the state of charge of another one of the plurality of battery modules, assigning a fourth output voltage setpoint to a fourth one of the plurality of DC-DC power converters, and reducing the output voltage setpoint of the third one of the plurality of DC-DC power converters to a value less than the fourth output voltage setpoint.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
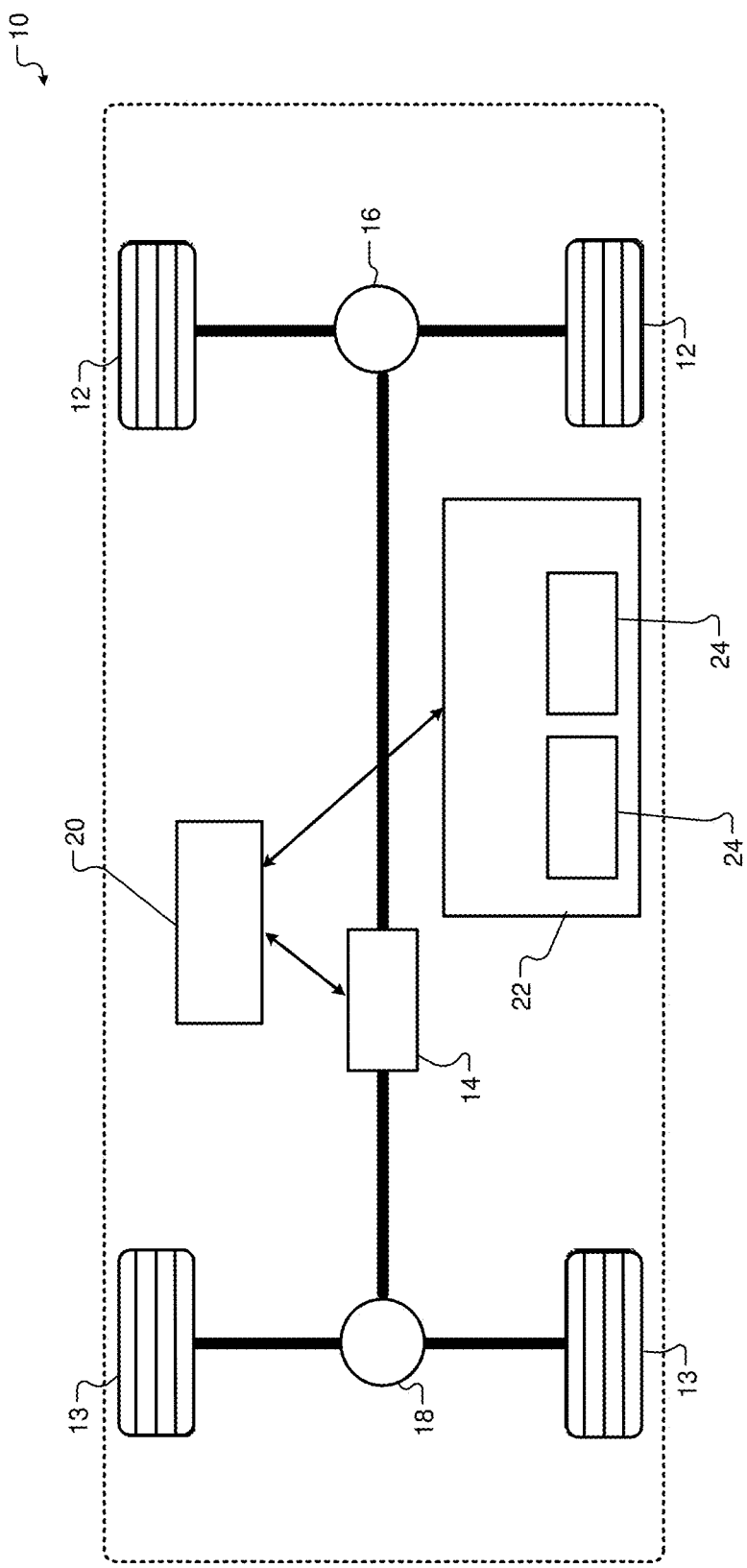
FIG. 1 is a functional block diagram of an example vehicle including a rechargeable energy storage system (RESS) including multiple DC-DC power converters, according to the present disclosure.

In some example embodiments, a control system is configured to balance one or more parameters of a vehicle energy storage system (e.g., a reusable energy storage system (RESS)), such a state-of-charge (SOC) values or voltages across multiple columns or modules of the energy storage system, and temperatures across the columns or modules of the energy storage system and multiple DC-DC converters. For example, multiple DC-DC Converters used to supply low voltage power needs in an electric vehicle may be connected across individual columns/modules of a vehicle energy storage system, instead of across the entire vehicle energy storage system.

Connecting individual DC-DC converters across separate columns/modules, instead of the entire energy storage system, enables the DC-DC converters to be fail operation power (FOP) redundant, to provide automotive safety integrity level (ASIL) D power, such as in a low voltage, battery-less architecture. The DC-DC converters may use a setpoint priority strategy to selectively make one DC-DC converter at a time carry most or all of the low voltage loads. For example, a control algorithm may choose a "dominant" DC-DC converter based upon a lowest DC-DC converter temperature, and then select a DC-DC converter based on a highest column/module state of charge (SOC), and then a highest column/module cell temperature.

In some examples, connecting DC-DC converters across separate columns/modules of a rechargeable energy storage system (RESS) may allow the DC-DC converters to selectively and preferentially pull more or less low voltage power from one RESS column/module compared to others, by varying DC-DC converter output voltage setpoints in order to balance the SOC (e.g., voltage) differences between RESS columns/modules, to balance the temperatures across RESS columns/modules cells, to balance the temperatures across the DC-DC converters, etc. Example control designs may enable the system to provide redundant FOP with a low voltage battery-less architecture, as well as to balance critical RESS and DC-DC converter parameters that might otherwise cause a catastrophic FOP system failure.

Some ASIL D low volage power systems are designed with a single, dual output DC-DC converter connected across the entire RESS, and one or more low voltage batteries as a backup. If even a single cell or connection in the RESS opens, all power through the DC-DC converter may be lost, and the system runs on the backup battery to pull the vehicle over. In some examples described herein, multiple DC-DC converters are connected across individual columns/modules of the RESS, so only partial power is lost if a single cell or connection opens, making the DC-DC converters self-redundant, and low voltage batteries optional.

The dual output DC-DC converter arrangement of some systems has a single setpoint, and the system tries to equalize the current between the dual outputs. In some example embodiments described herein, multiple DC-DC converters are used with individual setpoints for each DC-DC converter, and they system may purposefully use unmatched outputs for each DC-DC converter. Instead, a dominant DC-DC converter may be selected or established, which handles most or all of normal power loads, with the other DC-DC converter(s) used as backups to prevent voltage droop.

The system architecture of some example embodiments provide the ability to pull low voltage power from one part of the RESS selectively and preferentially over other parts of the RESS, which can be used to supplement cell balancing capabilities on a column/module basis, and/or to balance temperatures of the individual DC-DC converters or cells within a column/module. In some example embodiments, control algorithms for a propulsion system active (PSA) period, enabled by the multiple DC-DC converter design, allow the system to increase or maximize the operating headroom above key parameters like SOC mismatch on a RESS column/module level, DC-DC converter temperature, and/or RESS cell temperature.

Example algorithms in a random, high power load system may work toward bringing key parameters of the system back into balance. Once balanced, the example control algorithms may facilitate keeping the key parameters in balance. In the event that balance cannot be balanced due to large, random power events, the example control algorithms may work again toward restoring balance during propulsion system active (PSA). The example control algorithms may operate slightly differently during key ON and key OFF scenarios for the vehicle, with a common goal of balancing system parameters in each case.

As described further below, in some examples a system includes a plurality of DC-DC converters providing low voltage power, each connected across individual columns/modules of a high voltage RESS, to create a redundant, low voltage power system up to an ASIL D rating. This may enable a low voltage, battery-less design.

For example, a tiered DC-DC converter setpoint strategy during PSA (e.g., propulsion system active) may prioritize the coolest DC-DC converter temperature, followed by the highest SOC RESS column/module, and finally the lowest temperature RESS columns/modules, to supply low voltage power until each of these parameters is brought into an acceptably balanced condition. After the RESS columns/modules SOCs and RESS columns/modules and DC-DC converter temperatures are within an acceptably balanced condition during PSA, the system may implement a cyclical DC-DC converter setpoint strategy that rotates priority of the DC-DC Converters for a given duration or Coulomb count.

During key OFF (e.g., Propulsion System Inactive), the system may vary the time or Coulomb count limit for each DC-DC Converter, by prioritizing the coolest DC-DC converter if the DC-DC converter temperatures are above a specified threshold, and then a highest SOC column/module, followed by a coolest maximum cell temperature of the column/modules when a cell temperature is above a specified threshold. Once key OFF balance is achieved, the system may be configured to maintain the balance by adjusting the time (e.g., preferred duration) or Coulomb count that each DC-DC converter is enabled. By using the low voltage power demand, example embodiments may enable much faster column/module SOC (e.g., voltage) balancing than available by use of passive methods connected across individual cells.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control the operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a vehicle battery module 22, which may include any suitable batteries for supplying power to the vehicle 10. For example, the vehicle battery module 22 may include one or more batteries, battery packs, etc., which can be recharged and store power to supply energy to the vehicle (such as lithium batteries). The batteries, battery packs, etc., may be connected with one another in any suitable arrangement, such as multiple groups in parallel, in series, etc. The vehicle battery module 22 may be considered as, or part of, a battery disconnect unit (BDU) or rechargeable energy storage system (RESS).

The vehicle battery module 22 may supply power to one or more components of the vehicle 10, such as the drive unit 14, the vehicle control module 20, other electronic components of the vehicle 10, etc. The vehicle control module 20 may be coupled to control charging and discharging of the vehicle battery module 22.

As shown in FIG. 1, the vehicle battery module 22 includes multiple DC-DC converters 24. Each DC-DC converter 24 may be connected to individual columns or modules of the vehicle battery module 22, to allow the DC-DC converters 24 to selectively and preferentially pull more or less low voltage power from one RESS column/module compared to others, by varying DC-DC converter output voltage setpoints in order to balance the SOC (e.g., voltage) differences between RESS columns/modules, to balance the temperatures across RESS columns/modules cells, to balance the temperatures across the DC-DC converters 24, etc. Example control designs may enable the system to provide redundant FOP with a low voltage battery-less architecture, as well as to balance critical RESS and DC-DC converter parameters that might otherwise cause a catastrophic FOP system failure.

Although FIG. 1 illustrates one vehicle battery module 22 and two DC-DC converters, other example embodiments may have more vehicle battery modules, more DC-C converters, vehicle battery modules and DC-DC converters at other locations in the vehicle, etc.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

In some examples, an electric vehicle (EV) includes multiple distributed DC-DC power converters each configured to convert an output voltage from one or more high voltage batteries, to a lower output voltage for a low voltage load coupled to the DC-DC power converters. The multiple DC-DC power converters may provide redundancy for the low voltage load.

The multiple DC-DC power converters may be controlled (e.g., by a vehicle control module) to operate in a voltage control mode, and share a low voltage load current equally or differentially with output voltage regulation. In examples, it may be desirable to regulate another electrical characteristic of one or more of the multiple DC-DC power converters, such as an input or output current, an input voltage, etc.

In some examples, an energy storage system (such as a rechargeable energy storage system (RESS) of an electric vehicle), may include multiple DC-DC power converters each controllable to operate in a selected operating mode, such as a voltage control mode, a current control mode, a power control mode, etc., based on one or more received operating characteristics and setpoints. This flexibility to control the multiple DC-DC power converters in different operating modes enables the DC-DC power converters to regulate specific electrical characteristics of the DC-DC power converters for supporting low voltage loads, while also balancing a target state of charge of high voltage batteries.

Figure 2A:
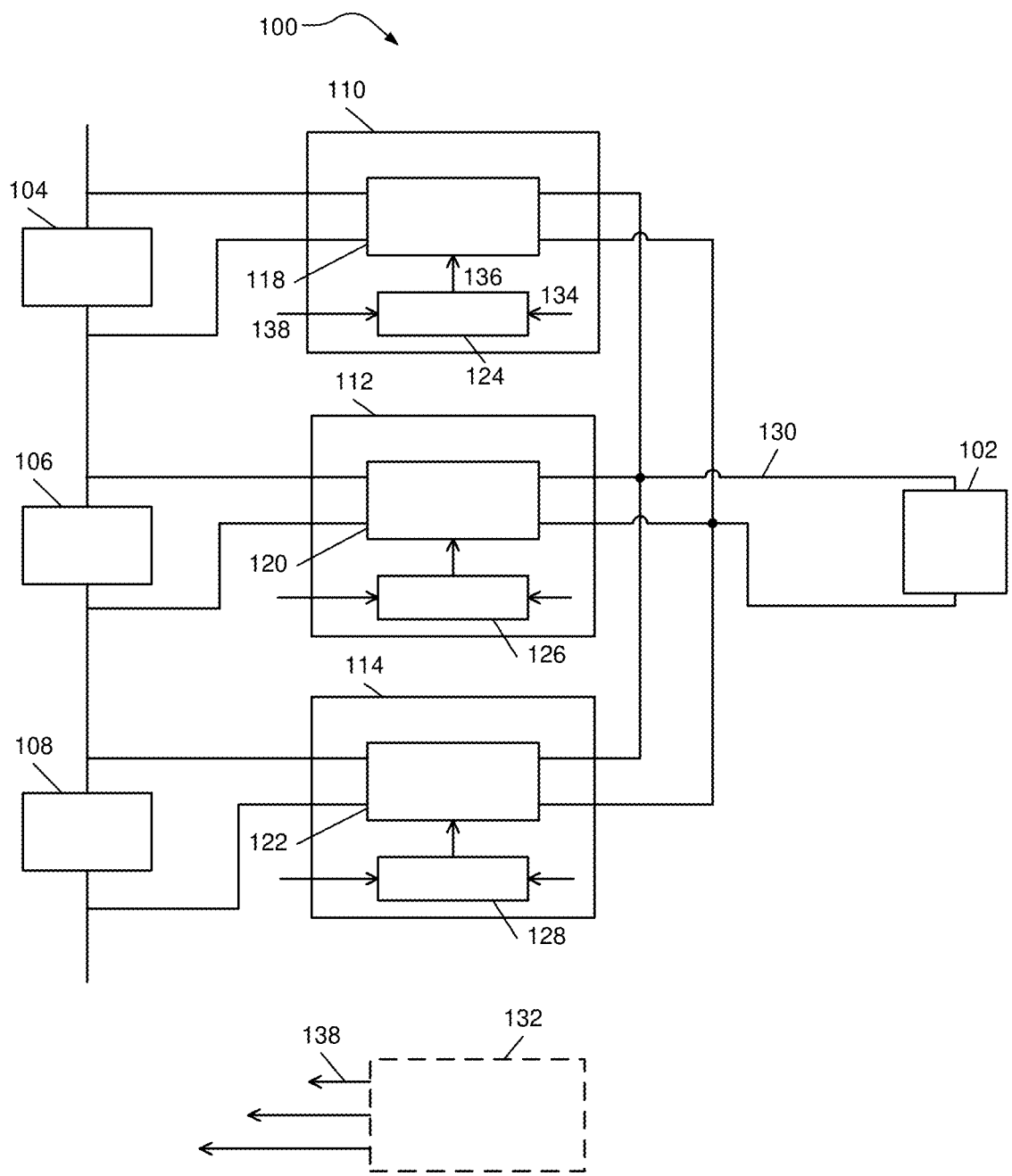
FIG. 2A is an example circuit diagram of multiple DC-DC converters coupled to supply power to one or more low voltage loads, according to the present disclosure.

Referring now to FIG. 2A, an RESS 100 and a low voltage load 102 coupled to the RESS 100 are shown. The RESS 100 includes multiple high voltage battery modules 104, 106, 108 (e.g., 400V, etc.), multiple DC-DC power converters 110, 112, 114, and a load 102 coupled to the DC-DC power converters 110, 112, 114 via a DC bus 130. Each battery module 104, 106, 108, 116 may include one or more battery cells, such as a column of battery cells grouped together as a battery module. Although the RESS 100 of FIG. 2A is shown as including three high voltage battery modules 104, 106, 108, three power converters 110, 112, 114 and one low voltage battery module 116, it should be appreciated that the RESS 100 may include more than one low voltage load, more or less high voltage battery modules, and/or more or less power converters in other embodiments.

Figure 2B:
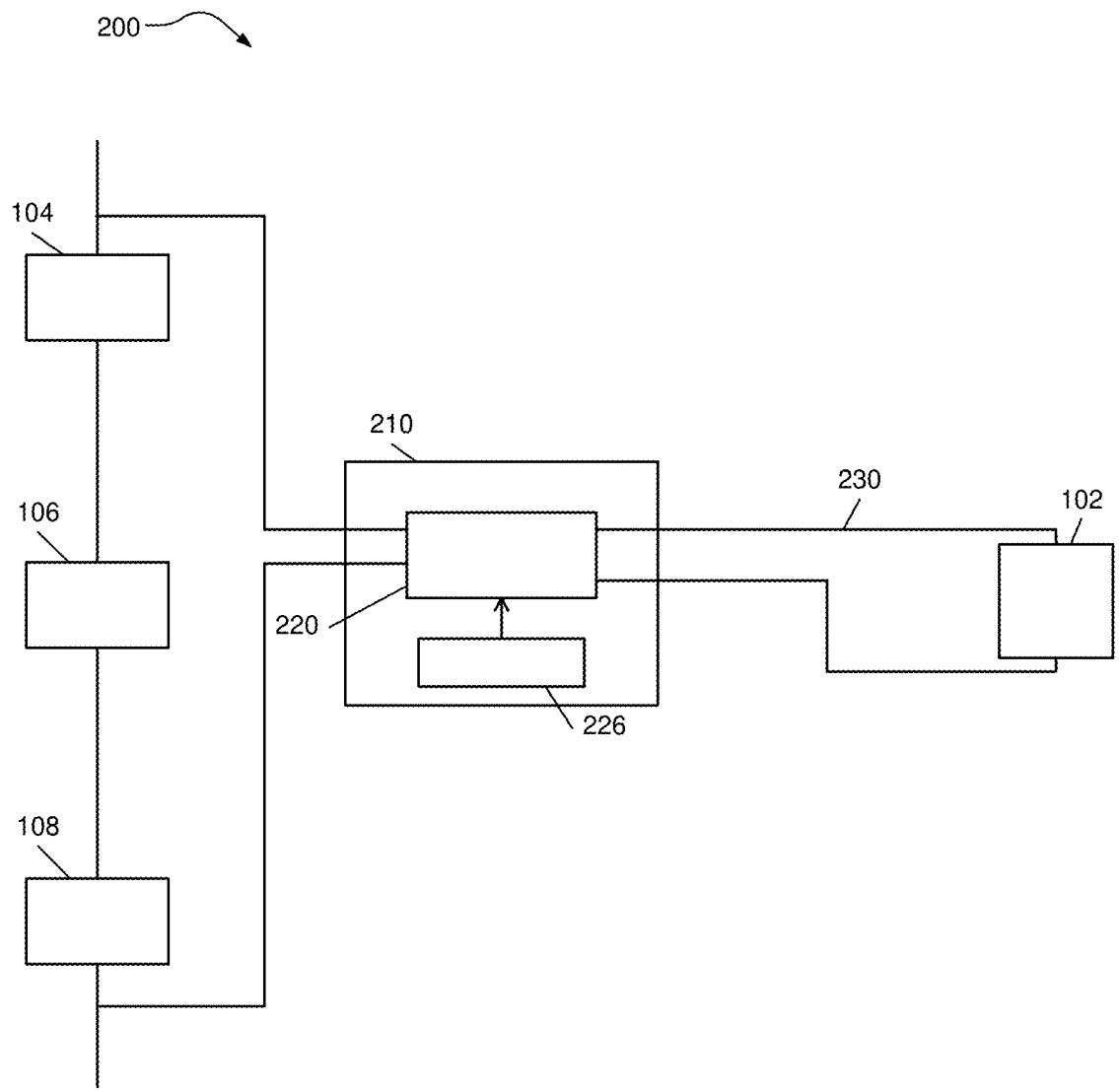
FIG. 2B is an example circuit diagram of a DC-DC converter coupled across all battery modules of a rechargeable energy storage system (RESS)

FIG. 2B is an example circuit diagram of a different arrangement where a DC-DC power converter 210 is coupled across all battery modules 104, 106 and 108 of a rechargeable energy storage system (RESS) 200. In contrast to the arrangement of FIG. 2A, the DC-DC power converter 210 of FIG. 2B is coupled across all battery columns of the RESS 200 to supply low volage power to a low voltage load 102 via a DC bus 230. The DC-DC power converter 210 may include one or more converter circuits 220, and a controller 226.

Referring again to FIG. 2A, the DC-DC power converters 110, 112, 114 each include a power converter circuit 118, 120, 122 operable in different operating modes and a controller 124, 126, 128, respectively, coupled to the power converter circuit 118, 120, 122 for controlling the power converter circuit 118, 120, 122. While each power converter 110, 112, 114 of the RESS 100 is shown as including a dedicated controller, it should be appreciated that one or more of the power converters 110, 112, 114 may not include a dedicated controller. In such embodiments, one or more of the converter circuits 118, 120, 122 may be controlled by a system controller such as a controller 132 shown in dashed lines in FIG. 2A.

Each of the converter circuits 118, 120, 122 has opposing sides. One side (e.g., a high voltage side) of each converter circuit 118, 120, 122 is coupled to individual ones of the high voltage battery modules 104, 106, 108. For example, and as shown in FIG. 1, the converter circuit 118 is coupled to the battery module 104, the converter circuit 120 is coupled to the battery module 106, and the converter circuit 122 is coupled to the battery module 108. Each of the other sides (e.g., low voltage sides) of the converter circuits 118, 120, 122 are coupled in parallel and to the DC bus 130.

The controllers 124, 126, 128 may receive operating characteristics of the converter circuits 118, 120, 122 and setpoints (e.g., reference values) associated with the operating characteristics. For example, the controller 124 may receive one or more input signals 134 indicative of one or more operating characteristics of the converter circuit 118, operating characteristics of the RESS 100, operating characteristics of the other converter circuits 120, 122 in the RESS 100, etc. Additionally, the controller 124 may receive setpoints associated with the operating characteristics via a communication link with the system controller 132 or another controller in the RESS 100. Then, once the operating mode is selected (as further explained below), the controller 124 controls the converter circuit 118 via one or more control signals 136 (e.g., PWM control signals, etc.) to operate in the selected operating mode based on the received operating characteristics and one of the setpoints.

In various embodiments, the controllers 124, 126, 128 include one or more communication interfaces for receiving signals from and/or transmitting signals to the system controller 132. In such examples, the controllers 124, 126, 128 may receive signals including, for example, a wakeup command, an enable command, a disable command, set point values, programmable limit thresholds, etc. The communication interfaces may include, for example, an I2C interface, local interconnect network (LIN) interface, a controller area network (CAN) interface, serial peripheral interface (SPI), etc.

With continued reference to FIG. 2A, each converter circuit 118, 120, 122 may include any suitable converter topology such as, for example, a dual active bridge topology, an interleaved topology, a boost topology, a buck topology, a buck-boost topology, a flyback topology, a push-pull topology, etc. Additionally, each converter circuit 118, 120, 122 may include the same converter topology. In other embodiments, at least one of the converter circuits 118, 120, 122 may have a converter topology that is different than the other converter circuits 118, 120, 122.

Figure 3:
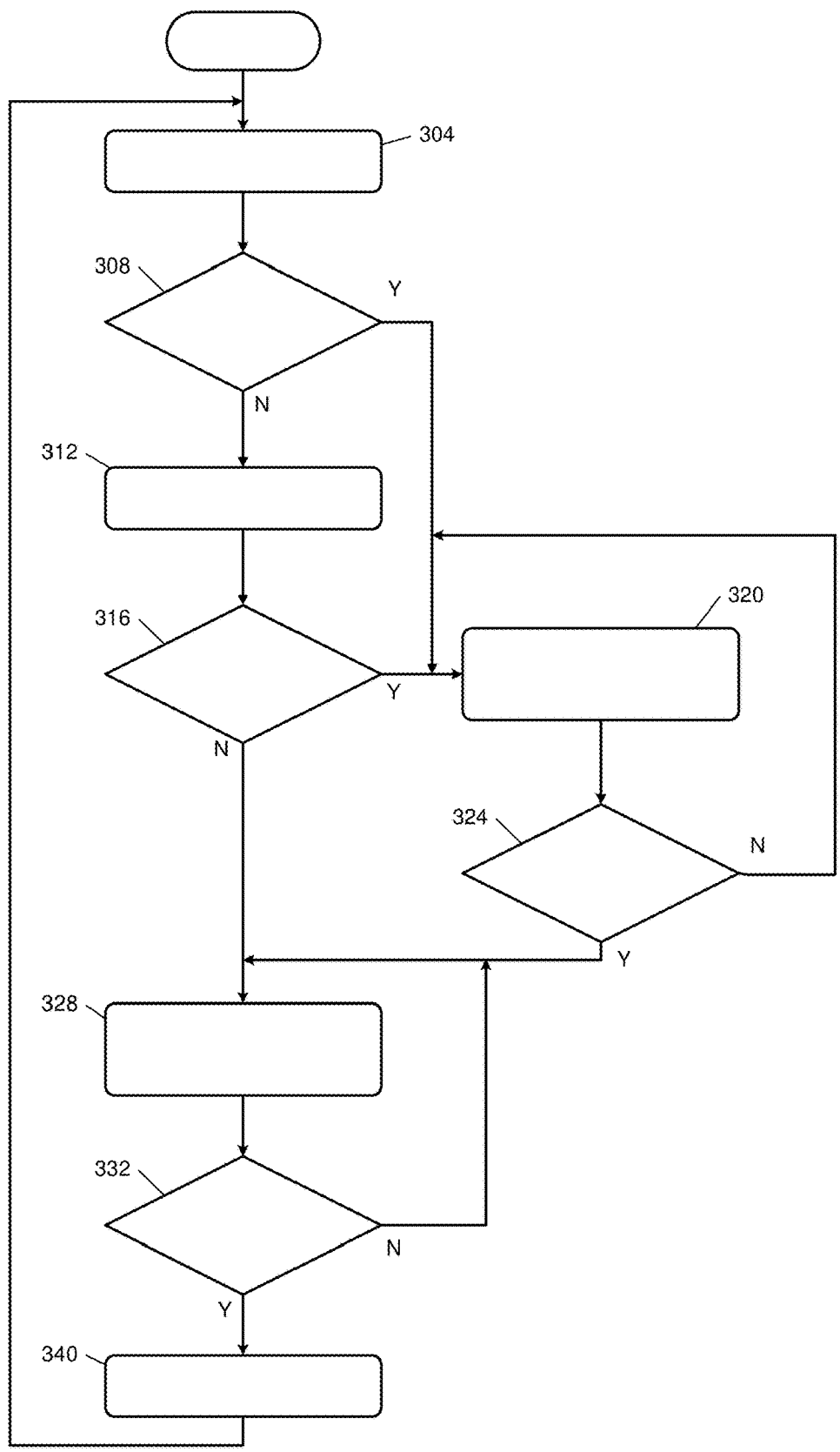
FIG. 3 is a flowchart of an example process for controlling setpoints of multiple DC-DC converters, according to the present disclosure.

FIG. 3 illustrates an example control process employable by, for example, the vehicle control module 20 of FIG. 1, or the control module 124 of FIG. 2A. At 304, the process begins by determining a vehicle operating mode. For example, the vehicle may be in a fail operational power (FOP) mode, a normal mode with an average low voltage power value below a specified threshold, a normal mode with an average low voltage power value above the specified threshold, a propulsion system active (PSA) mode, a key OFF mode, etc.

If the current mode of the vehicle is fail operational power at 308, control proceeds to 320 to set a DC-DC converter temperature priority for next cycles of converter operation. Further details of the DC-DC temperature priority control are discussed below relative to FIG. 4.

If the current mode of the vehicle is not FOP at 308, control proceeds to 312 to determine an average low volage power value (e.g., an average amount of power supplied by the DC-DC converters to one or more low voltage loads over a specified period of time).

Control determines at 316 whether the average low voltage power value is greater than a specified threshold. For example, the specified threshold may be indicative of an amount of power supplied that could overheat one or more of the DC-DC converters.

If the average low voltage power value is greater than the threshold, control proceeds to 320 to set the DC-DC converter temperature priority for next cycles of converter operation. After running one or more cycles of DC-DC converter operation at 320, control determines at 324 whether the converter temperatures are equal (e.g., whether the DC-DC temperature priority setpoint control has finished balancing the DC-DC converter temperatures). If not, control returns to 320 to continue operating the DC-DC converters using the DC-DC converter temperature priority.

Once the converter temperatures are equal at 324, or if the average low voltage power value is less than the threshold at 316 (e.g., indicating low heating demands on the DC-DC converters), control proceeds to 328 to set a column state of charge (SOC) mismatch priority for next DC-DC converter operation cycles. Further details regarding an example battery column SOC control algorithm are described further below relative to FIG. 5.

At 332, control determines whether the SOC values for each column of batteries (e.g., battery module) associated with respective DC-DC converters are equal. If not, control returns to 328 to continue operation of the DC-DC converters using the battery column SOC priority control algorithm.

Once the battery column SOC values are equal at 332, control proceeds to 340 to cycle through the DC-DC converters with equal durations. For example, each DC-DC converter may have an assigned priority (e.g., a highest voltage output setpoint) relative to the other converters, for a specified time period or Coulomb count. Once the time period or Coulomb count is reached, control proceeds to set a highest output voltage for a next DC-DC converter in a rotating manner, to maintain balance of all of the DC-DC converters.

Figure 4:
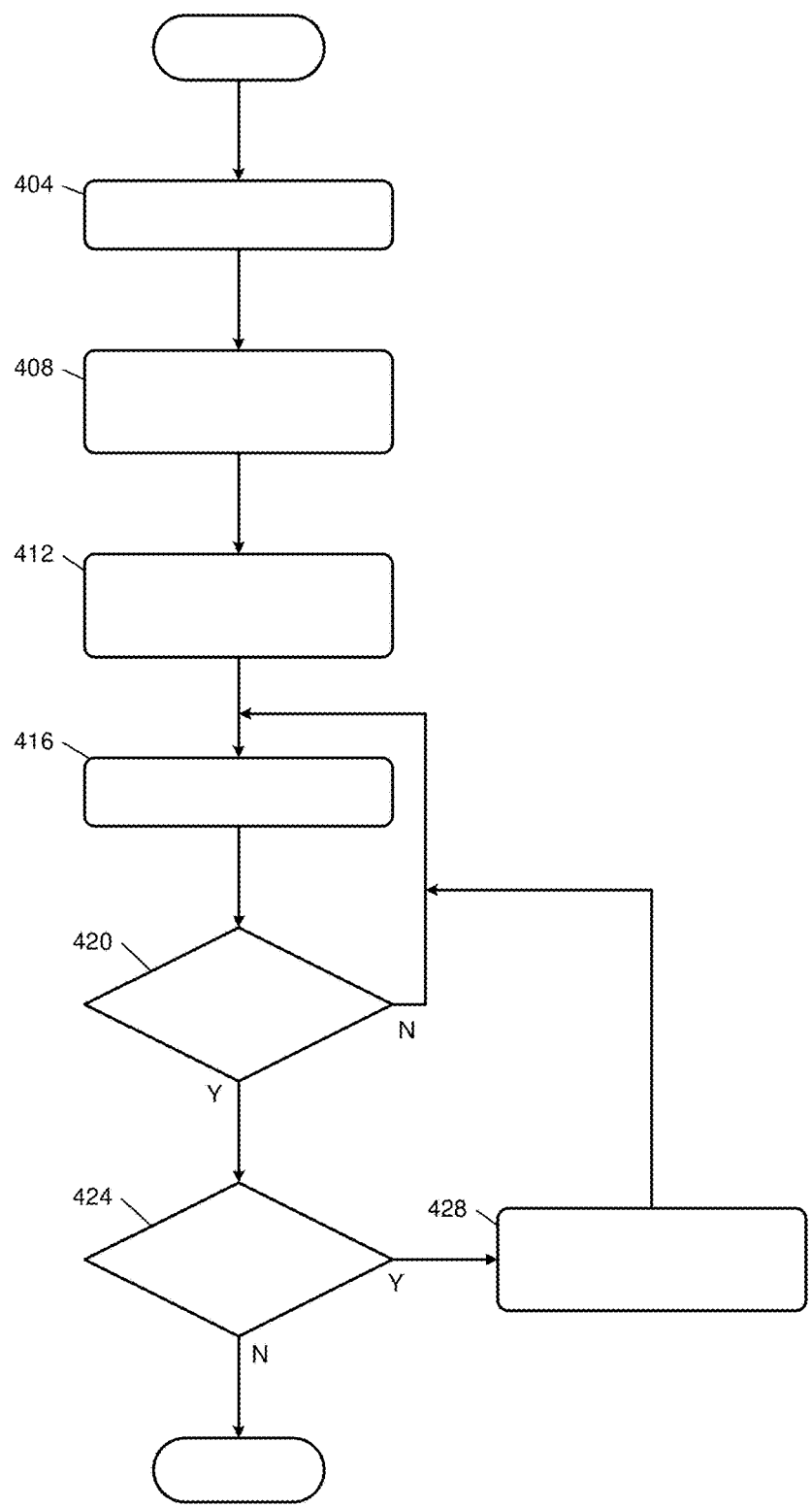
FIG. 4 is a flowchart of an example process for controlling setpoints of multiple DC-DC converters based on converter temperature priority, according to the present disclosure.

FIG. 4 illustrates an example control process employable by, for example, the vehicle control module 20 of FIG. 1, or the control module 124 of FIG. 2A. At 404, the process begins by obtaining a temperature of each DC-DC converter. For example, one or more temperature sensors, etc. may be used to determine a temperature of each DC-DC converter.

At 408, control ranks each DC-DC converter in an order of temperature, such as a list starting with a DC-DC converter having a lowest temperature, and ending with a DC-DC converter having a highest temperature. Control then assigns a greatest voltage output setpoint to the lowest converter, at 412. For example, in a case with three DC-DC converters, a lowest temperature DC-DC converter may be assigned a voltage output setpoint of 15.6 V, while the other hotter DC-DC converters are assigned voltage output setpoints of 15.5 V and 15.4 V.

At 416, control supplies power to the low volage load. For example, the DC-DC converter having the highest set point (e.g., the lowest temperature DC-DC converter) will provide most of the power to the low voltage load, due to its highest voltage output setpoint.

At 420, control determines whether the lowest temperature DC-DC converter has increased its temperature to be equal to the highest temperature DC-DC converter. For example, suppling power primarily from the original lowest temperature DC-DC converter, due to its highest voltage output setpoint, will increase the temperature of that DC-DC converter, while allowing the other less used or non-used DC-DC converters to cool (due to their lower voltage output setpoints and resulting reduction in power supplied to the low voltage load).

Once the original coolest DC-DC converter has reached a temperature equal to the highest temperature DC-DC converter at 420, control proceeds to 424 to determine whether there are any remaining cooler DC-DC converters. If so, control proceeds to 428 to assign the greatest voltage output to the next coolest DC-DC converter (e.g., the second coolest converter in the original ranked list from 408), and proceeds to operate the controllers with the new setpoints. For example, if converter A was assigned a setpoint of 15.6 V in the first example, converter B may be assigned a setpoint of 15.6 at 428, while converter A is reduced to a voltage output setpoint of 15.5V or 15.4 V (or any other suitable value). This process may be repeated depending on a total number of converters, until all DC-DC converters have reached a same or similar temperature at 424.

Figure 5:
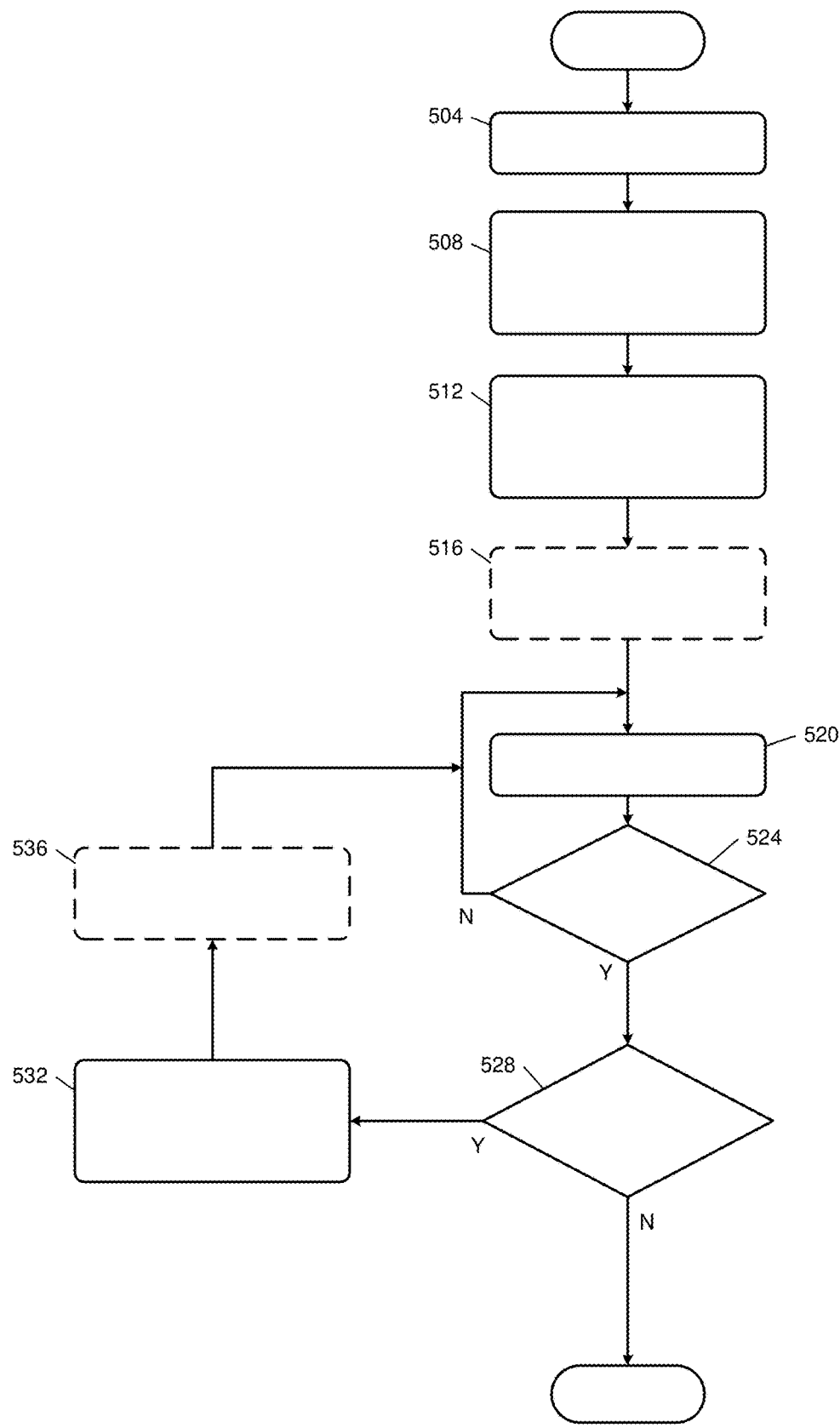
FIG. 5 is a flowchart of an example process for controlling setpoints of multiple DC-DC converters based on converter temperature priority, according to the present disclosure.

FIG. 5 illustrates an example control process employable by, for example, the vehicle control module 20 of FIG. 1, or the control module 124 of FIG. 2A. At 504, the process begins by obtaining a state of charge (SOC) of each battery column associated with a respective one of the DC-DC converters. For example, one or more voltage sensors, etc. may be used to determine a state of charge value across each column of batteries or battery module connected with an individual one of the multiple DC-DC converters.

At 508, control ranks each DC-DC converter in an order of SOC of associated battery columns/modules, such as a list starting with a DC-DC converter having a battery column/module with a highest SOC value, and ending with a DC-DC converter having a battery column/module with a lowest SOC value. Control then assigns a greatest voltage output setpoint to the converter with a highest associated SOC battery column, at 512. For example, in a case with three DC-DC converters, a highest associated SOC battery column DC-DC converter may be assigned a voltage output setpoint of 15.6 V, while the other DC-DC converters associated with lower SOC battery columns are assigned voltage output setpoints of 15.5 V and 15.4 V.

In some example embodiments, control optionally turns off all converters other than the one having the associated battery column with the highest SOC value, at 516. For example, the lower SOC battery column converters may be turned off when the system is in a key OFF mode, and use lower setpoints when the vehicle is in a propulsion system active (PSA) mode.

At 520, control supplies power to the low voltage load, using the assigned set point values. For example, the DC-DC converter having the highest set point (e.g., the DC-DC converter with an associated battery column having the highest SOC value) will provide most of the power to the low voltage load, due to its highest voltage output setpoint.

At 520, control determines whether the SOC of the battery column/module associated with the highest setpoint DC-DC converter has reduced its SOC to be equal to the lowest SOC column/module. For example, supplying power primarily from the highest setpoint DC-DC converter will decrease the SOC of the battery column/module associated with that converter, faster than the other less used or non-used DC-DC converters (due to their lower voltage output setpoints or being turned off).

Once the SOC of the battery column/module associated with the highest setpoint DC-DC converter has reduced to be equal to the lowest SOC battery column/module at 524, control proceeds 528 to determine whether there are any remaining DC-DC converters associated with higher SOC battery columns/modules. If so, control proceeds to 532 to assign the greatest voltage output to the next DC-DC converter associated with the next highest SOC battery column/module (e.g., the second highest SOC battery column/module in the original ranked list from 508), and proceeds to operate the controllers with the new setpoints.

For example, if converter A was assigned a setpoint of 15.6 V in the first example, converter B may be assigned a setpoint of 15.6 at 532, while converter A is reduced to a voltage output setpoint of 15.5V or 15.4 V (or any other suitable value). Optionally, at 536, control may turn off all other DC-DC converters other than the one being assigned the highest voltage output setpoint. This process may be repeated depending on a total number of converters, until all battery columns/modules associated with all DC-DC converters have reached a same or similar temperature SOC at 528.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An energy storage system for an electric vehicle, the energy storage system comprising:
   a plurality of battery modules;
   a plurality of DC-DC power converters each having first and second sides, each of the first sides coupled to one of the battery modules;
   a DC bus coupled to the second sides of the plurality of DC-DC power converters, the DC bus configured to supply power to one or more loads; and
   a vehicle control module configured to:
      obtain a temperature of each of the plurality of DC-DC power converters;
      assign a first output voltage setpoint to a first one of the plurality of DC-DC power converters having a lowest temperature, wherein output voltage setpoints assigned to other DC-DC power converters are less than the first output voltage setpoint;
      supply power to the DC bus via at least the first one of the plurality of DC-DC power converters; and
      in response to the temperature of the first one of the plurality of DC-DC power converters being greater than or equal to the temperature of another one of the plurality of DC-DC power converters, assign a second output voltage setpoint to a second one of the plurality of DC-DC power converters, and reduce the output voltage setpoint of the first one of the plurality of DC-DC power converters to a value less than the second output voltage setpoint.

2. The energy storage system of claim 1, wherein each of the plurality of battery modules includes a column of multiple battery cells connected in series.

3. The energy storage system of claim 2, wherein each of the plurality of DC-DC power converters is coupled with only one of the plurality of battery modules.

4. The energy storage system of claim 1, wherein the second output voltage setpoint and the first output voltage setpoint are equal.

5. The energy storage system of claim 1, wherein the vehicle control module is configured to, in response to the temperature of the second one of the plurality of DC-DC power converters being greater than or equal to the temperature of another one of the plurality of DC-DC power converters:
   assign a third output voltage setpoint to a third one of the plurality of DC-DC power converters; and
   reduce the output voltage setpoint of the second one of the plurality of DC-DC power converters to a value less than the third output voltage setpoint.

6. The energy storage system of claim 5, wherein:
   the first one of the plurality of DC-DC power converters has a lowest temperature of the plurality of DC-DC power converters;
   the second one of the plurality of DC-DC power converters has a second lowest temperature of the plurality of DC-DC power converters; and the third one of the plurality of DC-DC power converters has a third lowest temperature of the plurality of DC-DC power converters.

7. The energy storage system of claim 1, wherein the vehicle control module is configured to:
obtain a state of charge value for each of the plurality of battery modules;
assign a third output voltage setpoint to a third one of the plurality of DC-DC power converters coupled with a third one of the plurality of battery modules having a highest state of charge, wherein output voltage setpoints assigned to other DC-DC power converters are less than the third output voltage setpoint;
supply power to the DC bus via at least the third one of the plurality of DC-DC power converters; and
in response to the state of charge of the third one of the plurality of battery modules being less than or equal to the state of charge of another one of the plurality of battery modules, assign a fourth output voltage setpoint to a fourth one of the plurality of DC-DC power converters, and reduce the output voltage setpoint of the third one of the plurality of DC-DC power converters to a value less than the fourth output voltage setpoint.

8. The energy storage system of claim 7, wherein the third output voltage setpoint and the fourth output voltage setpoint are equal.

9. The energy storage system of claim 7, wherein the vehicle control module is configured to, in response to the state of charge of the fourth one of the plurality of battery modules being less than or equal to the state of charge of another one of the plurality of battery modules:
assign a fifth output voltage setpoint to a fifth one of the plurality of DC-DC power converters;
and reduce the output voltage setpoint of the fourth one of the plurality of DC-DC power converters to a value less than the fifth output voltage setpoint.

10. The energy storage system of claim 7, wherein the vehicle control module is configured to transition from assigning output voltage setpoints based on temperatures of the plurality of DC-DC power converters, to assigning output voltage setpoints based on state of charge values of the plurality of battery modules, in response to each of the DC-DC power converters having equal temperature.

11. The energy storage system of claim 7, wherein:
the vehicle control module is configured to assign output voltage setpoints based on temperatures of the plurality of DC-DC power converters in response to the electric vehicle being in a fail operational power (FOP) mode;
the vehicle control module is configured to assign output voltage setpoints based on temperatures of the plurality of DC-DC power converters in response to the electric vehicle being in a normal operation mode and a value of average low voltage power supplied to the DC bus being greater than a specified threshold; and
the vehicle control module is configured to assign output voltage setpoints based on state of charge values of the plurality of battery modules, in response to the electric vehicle being in a normal operation mode and a value of average low voltage power supplied to the DC bus being less than a specified threshold.

12. The energy storage system of claim 7, wherein the vehicle control module is configured to rotate between cycles of different output voltage settings for each of the plurality of DC-DC power converters, wherein:
in each cycle one of the plurality of DC-DC power converters is assigned a higher output voltage setpoint than other DC-DC converters; and
each cycle lasts for a specified time period or a specified Coulomb count for the one of the plurality of DC-DC power converters having the higher output voltage setpoint.

13. The energy storage system of claim 11, wherein the vehicle control module is configured to transition from assigning output voltage setpoints based on temperatures of the plurality of DC-DC power converters, to assigning output voltage setpoints based on state of charge values of the plurality of battery modules, in response to each of the DC-DC power converters having equal temperature.

14. A control method for an energy storage system for an electric vehicle, the energy storage system including a plurality of battery modules, a plurality of DC-DC power converters each having first and second sides, each of the first sides coupled to one of the battery modules, and a DC bus coupled to the second sides of the plurality of DC-DC power converters, the DC bus configured to supply power to one or more loads, wherein the method comprises:
obtaining a temperature of each of the plurality of DC-DC power converters;
assigning a first output voltage setpoint to a first one of the plurality of DC-DC power converters having a highest temperature, wherein output voltage setpoints assigned to other DC-DC power converters are less than the first output voltage setpoint;
supplying power to the DC bus via at least the first one of the plurality of DC-DC power converters; and
in response to the temperature of the first one of the plurality of DC-DC power converters being greater than or equal to the temperature of another one of the plurality of DC-DC power converters, assigning a second output voltage setpoint to a second one of the plurality of DC-DC power converters, and reduce the output voltage setpoint of the first one of the plurality of DC-DC power converters to a value less than the second output voltage setpoint.

15. The method of claim 14, wherein each of the plurality of battery modules includes a column of multiple battery cells connected in series.

16. The method of claim 15, wherein each of the plurality of DC-DC power converters is coupled with only one of the plurality of battery modules.

17. The method of claim 14, wherein the second output voltage setpoint and the first output voltage setpoint are equal.

18. The method of claim 14, further comprising, in response to the temperature of the second one of the plurality of DC-DC power converters being greater than or equal to the temperature of another one of the plurality of DC-DC power converters:
assigning a third output voltage setpoint to a third one of the plurality of DC-DC power converters; and
reducing the output voltage setpoint of the second one of the plurality of DC-DC power converters to a value less than the third output voltage setpoint.

19. The method of claim 18, wherein:
the first one of the plurality of DC-DC power converters has a lowest temperature of the plurality of DC-DC power converters;
the second one of the plurality of DC-DC power converters has a second lowest temperature of the plurality of DC-DC power converters; and the third one of the plurality of DC-DC power converters has a third lowest temperature of the plurality of DC-DC power converters.

20. The method of claim 14, further comprising:

obtaining a state of charge value for each of the plurality of battery modules;

assigning a third output voltage setpoint to a third one of the plurality of DC-DC power converters coupled with a third one of the plurality of battery modules having a highest state of charge, wherein output voltage setpoints assigned to other DC-DC power converters are less than the third output voltage setpoint;

supplying power to the DC bus via at least the third one of the plurality of DC-DC power converters; and in response to the state of charge of the third one of the plurality of battery modules being less than or equal to the state of charge of another one of the plurality of battery modules, assigning a fourth output voltage setpoint to a fourth one of the plurality of DC-DC power converters, and reducing the output voltage setpoint of the third one of the plurality of DC-DC power converters to a value less than the fourth output voltage setpoint.

* * * * *